(12) United States Patent
Zutler et al.

(10) Patent No.: US 12,128,942 B2
(45) Date of Patent: Oct. 29, 2024

(54) WHEEL ASSEMBLY TOE GUARD

(71) Applicant: GLOBAL INDUSTRIAL DISTRIBUTION INC., Port Washington, NY (US)

(72) Inventors: Bruce B. Zutler, Port Washington, NY (US); Harry E. Wellington, Port Washington, NY (US); Kevin Chow, Port Washington, NY (US); Daniel P. Doodnauth, Port Washington, NY (US); Richard B. Leeds, Port Washington, NY (US)

(73) Assignee: GLOBAL INDUSTRIAL DISTRIBUTION INC., Port Washington, NY (US)

( * ) Notice: Subject to any disclaimer, the term of this patent is extended or adjusted under 35 U.S.C. 154(b) by 0 days.

(21) Appl. No.: 18/502,631

(22) Filed: Nov. 6, 2023

(65) Prior Publication Data

US 2024/0140514 A1    May 2, 2024

Related U.S. Application Data

(63) Continuation of application No. 17/722,163, filed on Apr. 15, 2022, now Pat. No. 11,807,287.

(51) Int. Cl.
    *B62B 5/00*    (2006.01)
(52) U.S. Cl.
    CPC .................. *B62B 5/0006* (2013.01)

(58) Field of Classification Search
CPC ..... B66F 9/075; B62B 5/0006; B62B 5/0009; B62B 2203/20; B62B 2203/24; B62B 2203/26; B62D 25/161; B62D 25/163; B62D 25/168
See application file for complete search history.

(56) References Cited

U.S. PATENT DOCUMENTS

| 2,450,062 A | * | 9/1948 | Voss ........................ B60B 33/00 280/160 |
| 3,036,651 A | * | 5/1962 | Adolf .................... B62B 3/0612 280/43.12 |
| 3,560,021 A | * | 2/1971 | Watson ................ B62D 25/188 298/1 SG |
| 3,799,579 A | * | 3/1974 | Dahl .................... A01D 34/828 56/17.4 |

(Continued)

OTHER PUBLICATIONS

International Search Report and Written Opinion issued in International Application No. PCT/US22/50680 dated Feb. 14, 2023.

*Primary Examiner* — Jeffrey J Restifo
(74) *Attorney, Agent, or Firm* — TROUTMAN PEPPER HAMILTON SANDERS LLP

(57) ABSTRACT

A toe guard for use on a wheel assembly may include a first and second sidewall, each sidewall including an opening configured to engage with an axle of the wheel assembly. The first and second sidewalls may each further include one or more notches. The toe guard may further include a first locking pin configured to engage with at least one of the notches of the first and second sidewalls. Additionally, the toe guard may include one or more support plates connecting the first and second sidewalls, and a front plate configured to engage with at least one of the support plates or connect with at least one of the sidewalls.

7 Claims, 10 Drawing Sheets

(56) References Cited

U.S. PATENT DOCUMENTS

| | | | | |
|---|---|---|---|---|
| 4,027,771 A * | 6/1977 | Adams | B62B 3/0625 | 280/43.12 |
| 4,671,052 A * | 6/1987 | Martin | A01D 34/828 | 56/320.2 |
| 4,996,832 A * | 3/1991 | McKeever | A01D 34/828 | 56/320.1 |
| 5,026,079 A * | 6/1991 | Donze | B62B 1/20 | 280/47.33 |
| 5,113,960 A * | 5/1992 | Prinz | B62B 3/0612 | 280/43.12 |
| 6,260,646 B1 * | 7/2001 | Fernandez | B62B 3/0612 | 280/43.23 |
| 7,267,349 B2 * | 9/2007 | Sica | B60G 3/185 | 187/222 |
| 7,568,708 B2 * | 8/2009 | Vietri, Jr. | B62B 5/0006 | 280/43.12 |
| 10,850,759 B2 * | 12/2020 | Loveless | B62B 5/0006 | |
| 11,738,790 B2 * | 8/2023 | Kahlig | B62B 5/06 | 280/47.11 |
| 11,787,457 B1 * | 10/2023 | Loveless | B62B 3/06 | 280/160 |
| 11,807,287 B1 * | 11/2023 | Zutler | B62B 3/06 | |
| 2004/0188965 A1 * | 9/2004 | Feick | B62B 5/0006 | 280/47.131 |
| 2005/0241889 A1 * | 11/2005 | Nebolon | B62B 3/14 | 188/19 |
| 2008/0122253 A1 * | 5/2008 | Knie | B66F 9/07527 | 296/181.1 |
| 2008/0164668 A1 * | 7/2008 | Feick | B62B 1/20 | 280/47.31 |
| 2008/0197589 A1 * | 8/2008 | Vietri | B62B 3/06 | 280/43.12 |
| 2017/0282947 A1 * | 10/2017 | Meyer | B62B 1/186 | |
| 2019/0300037 A1 * | 10/2019 | Loveless | B62B 3/06 | |
| 2020/0385041 A1 * | 12/2020 | Jiang | B62B 5/004 | |
| 2021/0284220 A1 * | 9/2021 | Kahlig | B66F 9/075 | |
| 2023/0303143 A1 * | 9/2023 | Loveless | B62B 5/0006 | |
| 2023/0331274 A1 * | 10/2023 | Zutler | B62B 5/0006 | |
| 2024/0140514 A1 * | 5/2024 | Zutler | B62B 3/06 | |

\* cited by examiner

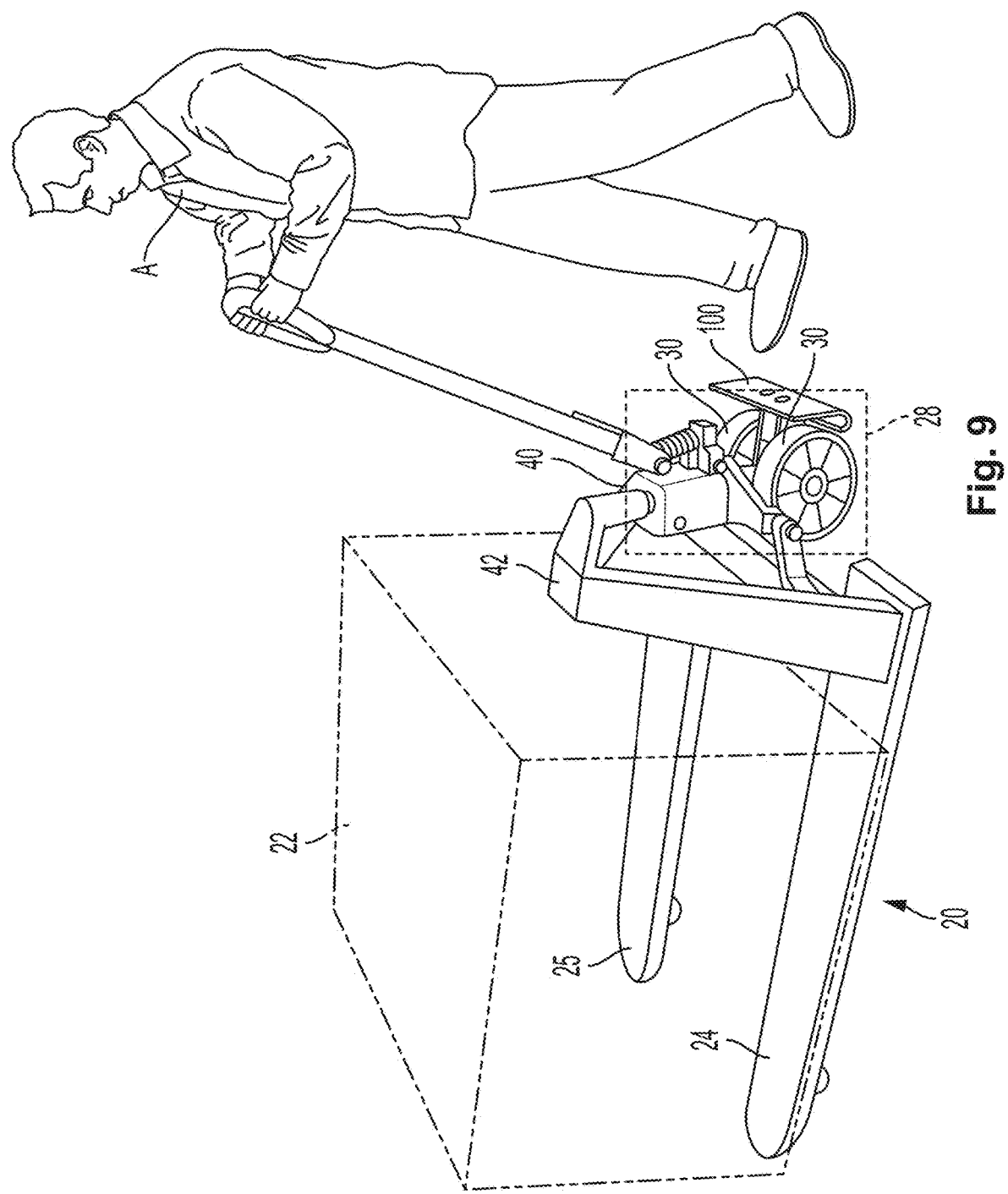

WHEEL ASSEMBLY TOE GUARD

CROSS-REFERENCE TO RELATED APPLICATIONS

This application is a continuation of, and claims priority under 37 C.F.R. § 120 to, U.S. patent application Ser. No. 17/722,163, filed Apr. 15, 2022, the entire contents of which are fully incorporated herein by reference.

FIELD

The present invention relates to a wheel assembly toe guard with enhanced operability.

BACKGROUND

Pallet trucks are used for lifting, pulling, pushing, and moving loaded pallets. Typical pallet trucks include a frame with two forks extending forwardly from the frame. Extending behind the frame is a handle, by which the pallet truck may be maneuvered by a pallet truck operator. Typically, at least one steer wheel is provided behind the frame, the steer wheel(s) capable of being turned by the movement of the handle and often sitting close to the feet of the operator.

In such configuration, the pallet truck may be pulled and pushed by an operator with the handle, the steer wheel(s) allowing for turning of the pallet truck by side-to-side orientation of the handle relative to the pallet truck frame.

In operation, the forks of a pallet truck may first be positioned underneath a loaded pallet. As an operator pivots the handle downwardly, a lifting mechanism of the pallet truck causes the frame and forks to raise, thereby lifting the loaded pallet from the surface upon which it was previously resting. Various lifting mechanisms have been provided in the art, which cause the forks and frame to lift the weight of the loaded pallet so that the pallet may be transported on the pallet truck. Part of the weight of the loaded pallet truck is borne by the steer wheel(s) at the rear of the pallet truck. Once loaded in this way, the pallet truck may be pulled and pushed to another location, and the load thereafter lowered and removed from the forks.

Use of a pallet truck with rear steel wheel(s) subjects the operator to the risk of running over his or her foot with the rear steer wheel(s) as the operator pulls the pallet truck toward himself or herself, a maneuver required in the use of such a pallet truck. Particularly with loaded pallet trucks, that risk may cause great physical injury to the foot. An operator's foot may slip to the wheel(s) while trying to pull the pallet truck toward the operator, or an operator may allow his or her foot to remain too long in the path of a steer wheel of a pallet truck rolling backwards. Furthermore, the feet of nearby co-workers are also at risk of injury from the rolling of such rear steer wheel(s).

In view of the wide use of pallet trucks and the risks of injury to operators, it would be desirable to provide a pallet truck wheel assembly toe guard. Various embodiments of toe guards are known; however, in many such embodiments, the toe guard includes a fixed or rigid connection with one or more components of a pallet truck wheel assembly, such as a wheel axle or steering column. A need therefore exists for an improved toe guard with more flexible and enhanced operability. Embodiments of the present disclosure are directed to this and other considerations.

SUMMARY

In accordance with certain embodiments of the disclosed invention, a toe guard for use on a wheel assembly is disclosed. The toe guard may include a first and second sidewall, each sidewall including an opening configured to engage with an axle of the wheel assembly. Each sidewall may further include one or more notches. The toe guard may further include a first locking pin configured to engage with at least one of the notches of the first and second sidewalls. Additionally, the toe guard may include one or more support plates connecting the first and second sidewalls, and a front plate configured to engage with at least one of the support plates or connect with at least one of the sidewalls.

In some embodiments, the toe guard may include a second locking pin, and the one or more notches may include a first notch and a second notch. The first locking pin may be configured to engage with the respective first notch of the first and second sidewalls, while the second locking pin may be configured to engage with the respective second notch of the first and second sidewalls. In some embodiments, the respective first notch of the first and second sidewalls may be disposed on a first side of a steering column of the wheel assembly, while the respective second notch of the first and second sidewalls may be disposed on a second side of the steering column. In some embodiments, the first and second sides may be opposite one another. This configuration allows for the first locking pin to engage with the steering column when the second locking pin is disengaged from the steering column, and vice versa.

In some embodiments, the one or more notches may be disposed along a respective top edge of the first and second sidewalls.

In some embodiments, the front plate may include one or more bumpers extending from a bottom edge of the front plate.

In some embodiments, the front plate may be configured to adjustably engage with at least one support plate such that a clearance between the front plate and the ground is adjustable.

In some embodiments, the front plate and at least one of the support plates may be disposed parallel to each other.

In accordance with certain embodiments of the disclosed invention, a system including a pallet truck and associated toe guard is disclosed. The system may include the pallet truck, which itself may include a steering column, and a rear steer wheel rotatable about an axle steerable, by the steering column, within a horizontal plane relative to the pallet truck. The system may further include the toe guard, which itself may include a first sidewall and a second sidewall. Each sidewall may include an opening, configured to engage with the axle, a first notch, and a second notch. The toe guard may include a first locking pin configured to engage with the first notch of the first and second sidewalls, and a second locking pin configured to engage with the second notch of the first and second sidewalls. The toe guard may include one or more support plates connecting the first sidewall to the second sidewall, and a front plate configured to adjustably engage with at least one of the one or more support plates.

In accordance with certain embodiments of the disclosed invention, a method of engaging a toe guard with a wheel assembly is disclosed. The method may include positioning the toe guard such that a first and second sidewall of the toe guard are engaged, via a respective opening, with an axle of the wheel assembly. The method may include engaging a first locking pin with a respective first notch of the first and second sidewalls. The method may further include engaging a second locking pin with a respective second notch of the first and second sidewalls.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 9 is a perspective view of a pallet truck with a wheel assembly toe guard according to certain aspects of the present disclosure.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified.

Figure 1:
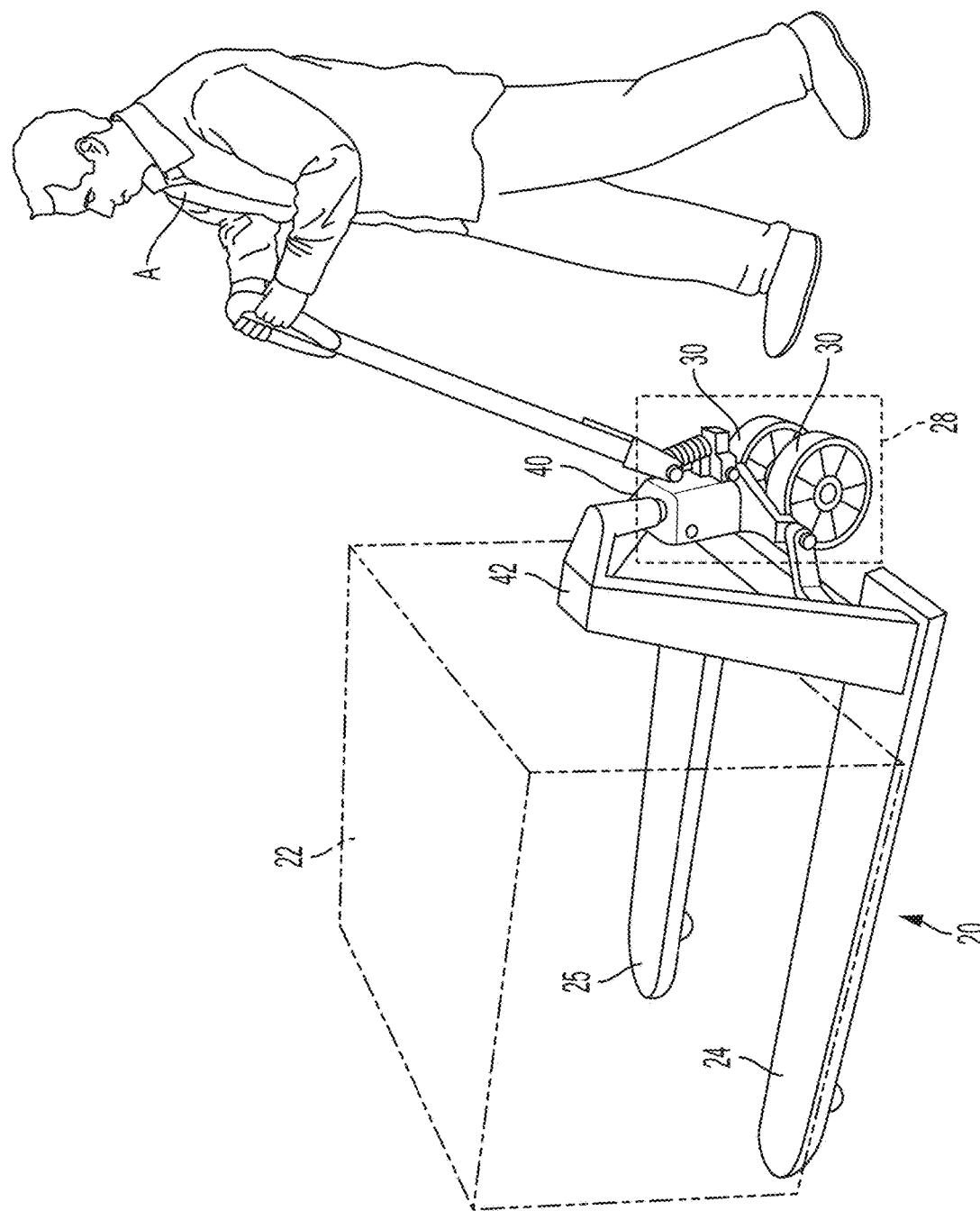
FIG. 1 is a perspective view of an exemplary pallet truck.
Figure 2:
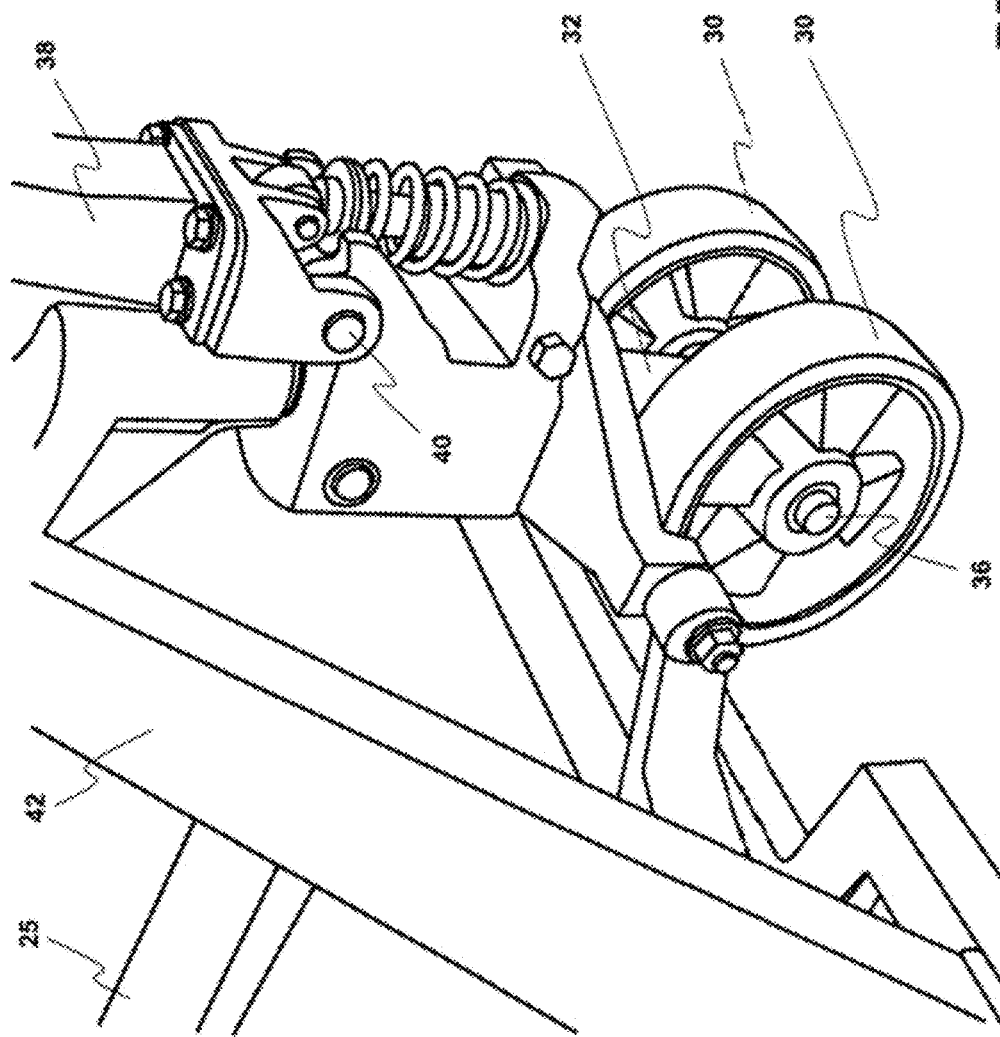
FIG. 2 is a perspective view of a steering assembly of an exemplary pallet truck.

The present subject matter may be more fully appreciated with reference to an exemplary pallet truck as found in the prior art and depicted in FIGS. 1-2. The pallet truck, generally 20, is used to move a load 22 (depicted in phantom). The pallet truck 20 includes a frame 42 and forks 24, 25 extending forwardly from such frame. Forks 24, 25 may be rolled beneath load 22, then the operator handle 38 pivoted up and down about handle pivot pin 40, causing frame 42 and forks 24, 25 to raise, thereby also raising load 22.

As shown in FIG. 1, a pallet truck includes at least one steer wheel 30 at the rear of the pallet truck. By moving operator handle 38 side to side, steer wheel 30 is caused to turn, thereby allowing for steering of pallet truck 20. Operation of pallet truck 20 requires that an operator, generally A, lift, steer, push, and pull upon operator handle 38. To do so, operator A is positioned near a steer wheel 30.

Pallet truck 20 includes steering assembly 28. An exemplary embodiment of a steering assembly 28 is depicted in greater detail in FIG. 2. Operator handle 38 is attached to pallet truck 20 about handle pivot pin 40. Pivoting operator handle 38 up and down about handle pivot pin 40 actuates the lifting mechanism of pallet truck 20, raising and lowering frame 42 and forks 24, 25. Swinging operator handle 38 side to side causes steering column 32, which depends downwardly from frame 42, to turn steer wheels 30. Steer wheels 30 are mounted upon wheel axle 36, which is disposed through steering column 32.

Reference will now be made in detail to exemplary embodiments of the disclosed technology, examples of which are illustrated in FIGS. 3A-3E, 4A-4B, 5A-5B, 6, 7A-7B, 8, and 9, and disclosed herein. Wherever convenient, the same reference numbers will be used throughout the drawings to refer to the same or like parts.

FIGS. 3A-3E, 4A-4B, 5A-5B, 6, 7A-7B, and 8 depict an embodiment of a wheel assembly toe guard in accordance with the present invention, and as such, are described simultaneously herein.

Figure 7A:
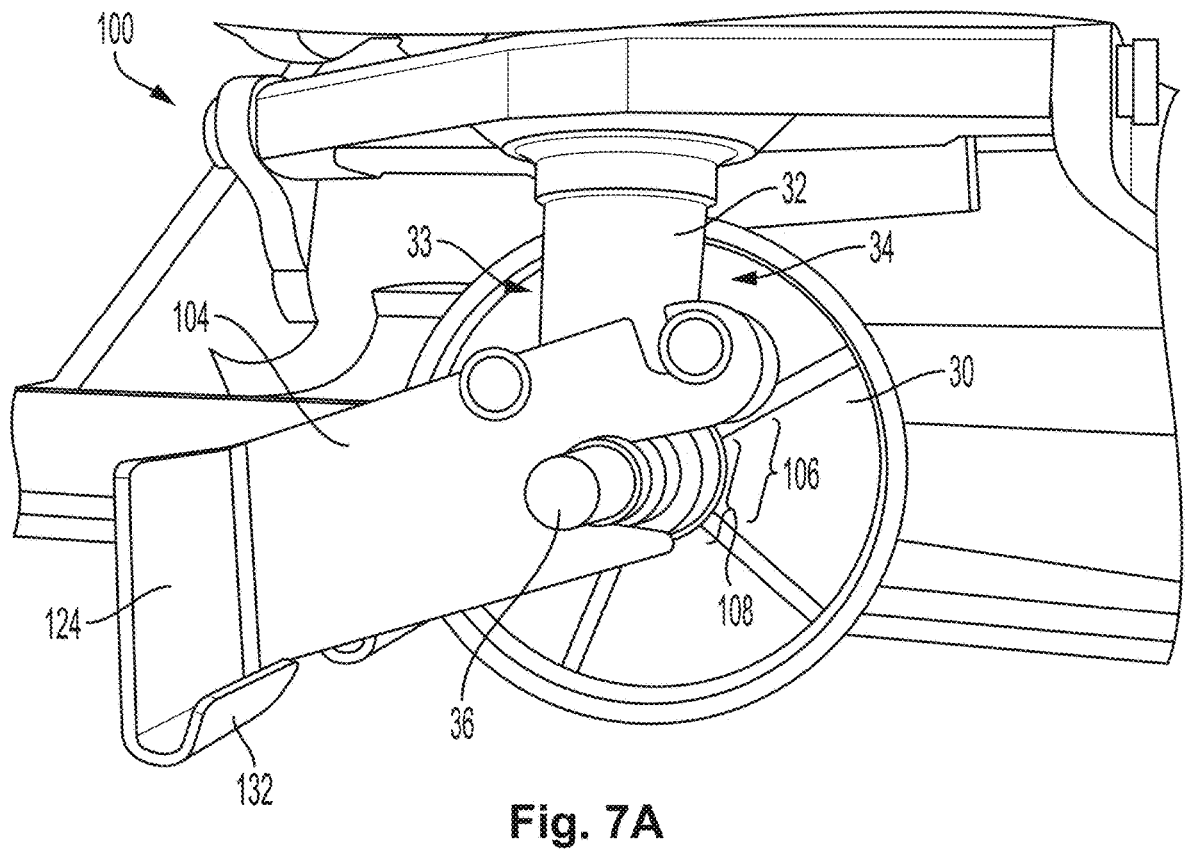
FIG. 7A is a side view of a wheel assembly toe guard engaged with the steering column according to certain aspects of the present disclosure.
Figure 7B:
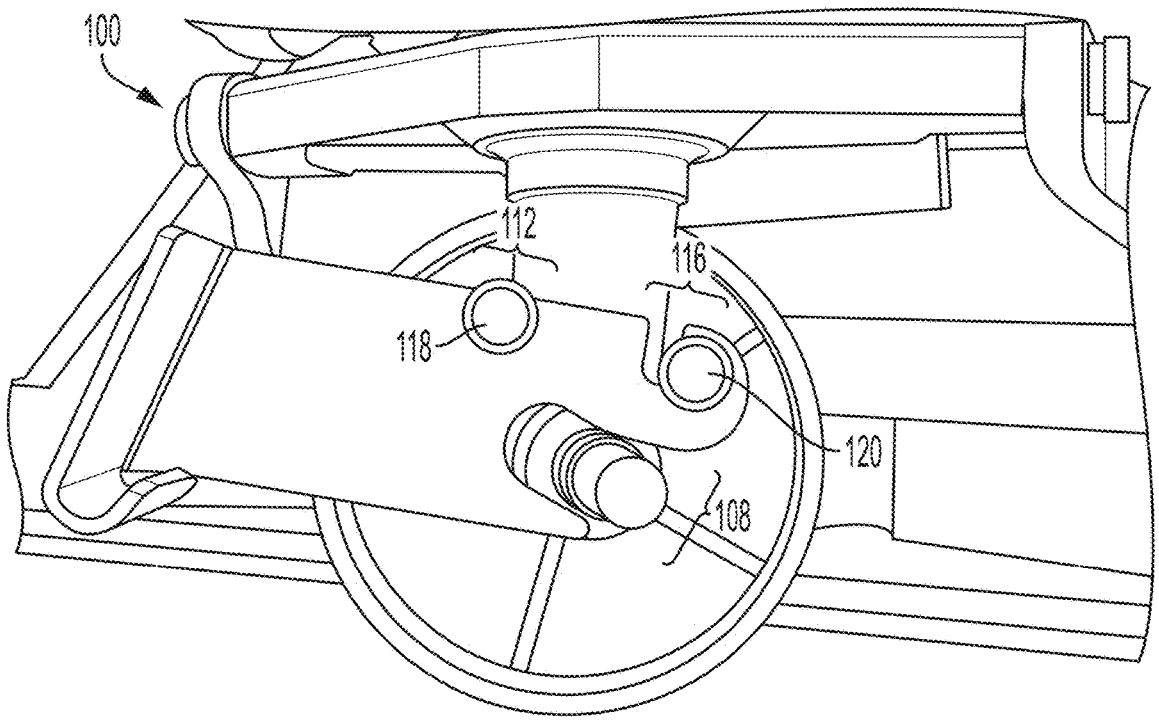
FIG. 7B is a side view of a wheel assembly toe guard partially disengaged with the steering column according to certain aspects of the present disclosure.
Figure 8:
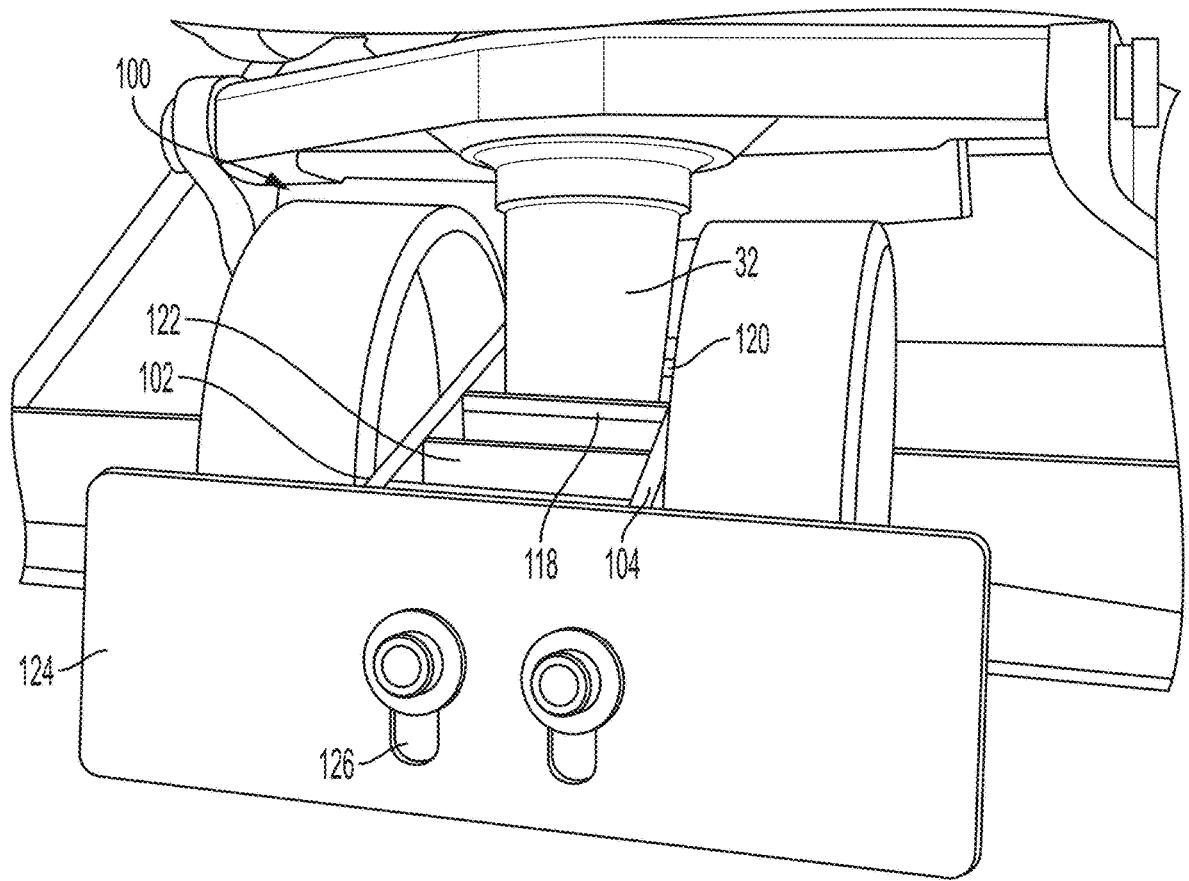
FIG. 8 is a front view of a wheel assembly toe guard according to certain aspects of the present disclosure.

As shown in FIGS. 3A-3B and 7A-7B, a wheel assembly toe guard 100 may be used on a variety of types of moveable devices that include at least one wheel. In particular, wheel assembly toe guard 100 may be used on a pallet truck of a type having a rear steer wheel 30 rotatable about an axle 36 steerable, by an attached steering column 32, within a horizontal plane relative to the pallet truck. The toe guard 100 may include a first sidewall 102 and a second sidewall 104 configured to engage or contact one or more components of a steering assembly 28, such as rear steer wheel axle 36 and/or steering column 32. That is, toe guard 100 may be configured to engage with steering assembly 28 such that first sidewall 102 and second sidewall 104 are each placed between a wheel 30 and the steering column 32, as shown in FIG. 8. The distance between the first and second sidewalls 102, 104 may vary depending on, for example, the size of the steering column 32, or the spacing of the wheel 30 with respect to a wheel assembly piston (not illustrated). In some embodiments, an inner distance between the first and second sidewalls 102, 104 may be approximately 2.19 inches, with the width of each sidewall being approximately 0.4 inches.

Figure 6:
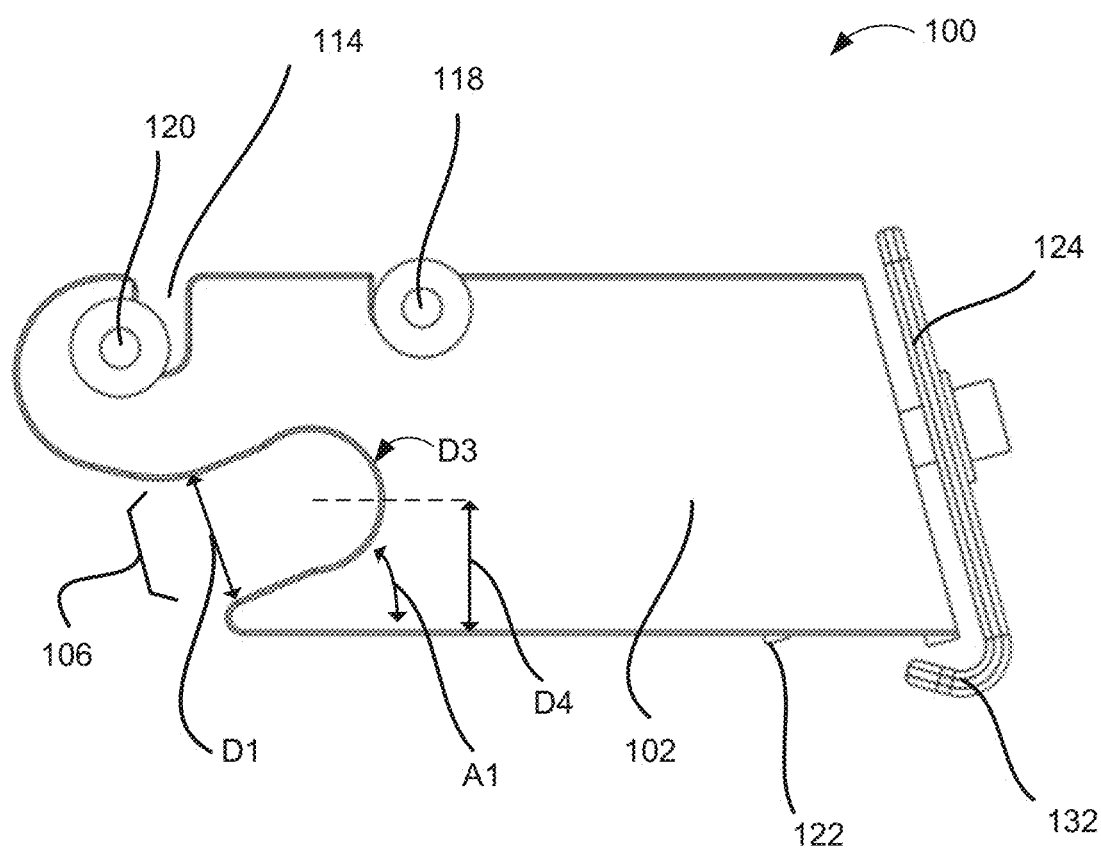
FIG. 6 is a side view of a wheel assembly toe guard according to certain aspects of the present disclosure.

Additionally, the first sidewall 102 and the second sidewall 104 may respectively include an opening 106, 108 configured to engage with the axle 36. As shown in FIGS. 7A-7B, openings 106, 108 may not be connected or rigidly fixed to axle 36, but may instead engage differently with axle 36 depending on whether toe guard 100 is in a first position (FIG. 7A) or a second position (FIG. 7B), as further described below. In some embodiments, as shown in FIG. 6, openings 106, 108 may include an opening distance D1 of approximately 1.00 inches, and be offset from the bottom edge of first and second sidewalls 102, 104 by an angle A1 of approximately 23.0 degrees. Openings 106, 108 may also extend into first and second sidewalls 102, 104 terminating in a circular shape with a diameter D3 of approximately 1.06 inches, the center of which may be disposed above the bottom edge of first and second sidewalls 102, 104 by a distance D4 of approximately 1.03 inches. In some embodiments, as particularly shown in FIG. 3E, openings 106, 108 may be configured as a vertical, or downward facing, U-shape extending from the bottom edge of first and second sidewalls, 102, 104, rather than at an angle A1. Such configuration may provide a benefit of added security of toe guard 100 when engaged with axle 36, particularly when toe guard 100 is configured with only a single locking pin, as further discussed below.

Figure 4A:
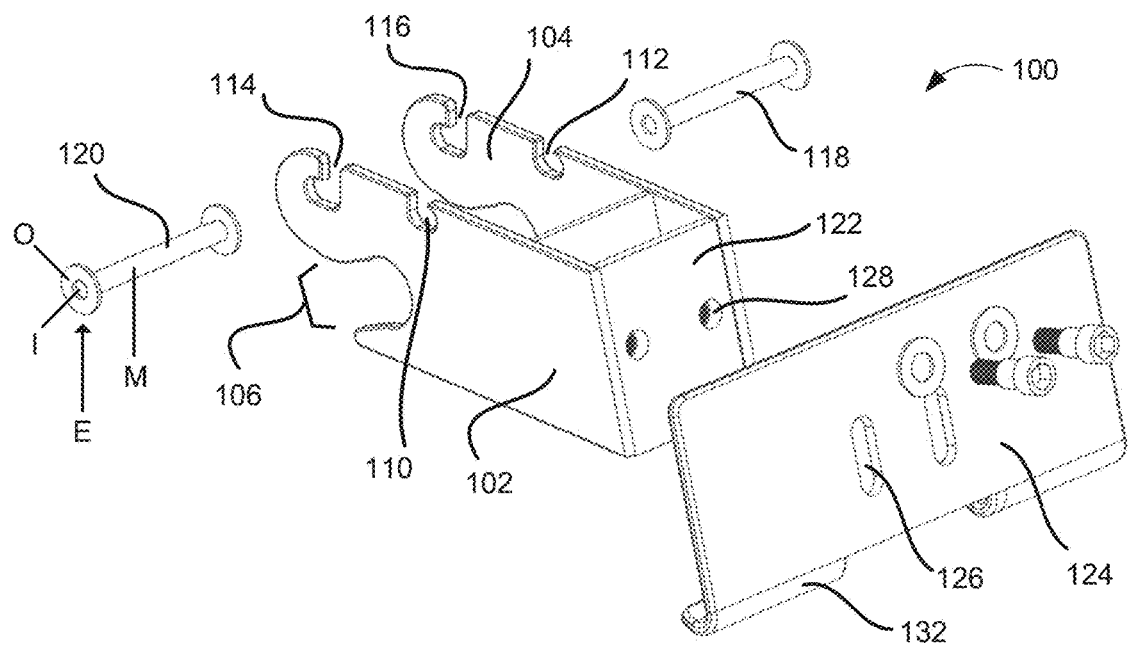
FIG. 4A is an exploded front left perspective view of a wheel assembly toe guard according to certain aspects of the present disclosure.
Figure 4B:
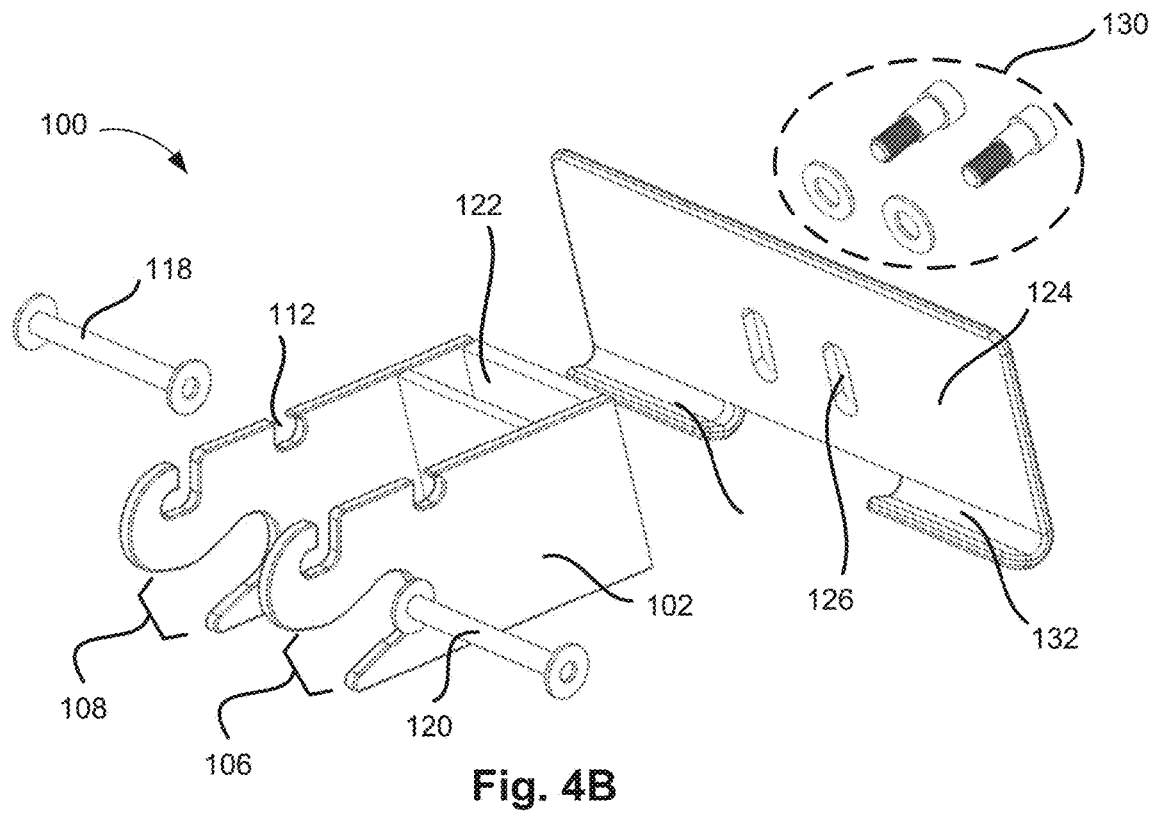
FIG. 4B is an exploded rear left perspective view of a wheel assembly toe guard according to certain aspects of the present disclosure.

As particularly shown in FIGS. 4A-4B, the first and second sidewalls 102, 104 may also respectively include a first notch 110, 112 and a second notch 114, 116. In some embodiments, first notch 110, 112 and second notch 114, 116 may be disposed along a top edge of first sidewall 102 and second sidewall 104, as particularly shown in FIGS. 4A and 6. In some embodiments, first notch 110, 112 and second notch 114, 116 may be configured as different shapes and/or sizes relative to each other. For example, as shown in FIGS. 4A-4B, while both first notch 110, 112 and second notch 114, 116 may be configured in a hook or L-shape, second notch 114, 116 may be configured as a deeper opening in comparison to first notch 110, 112. In some embodiments, as particularly shown in FIG. 3D, first notch 110, 112 and/or second notch 114, 116 may be configured as through-holes, of various shapes and/or sizes, through first and second sidewalls 102, 104, as further discussed below. Such different shapes and/or sizes may enable first notch 110, 112 and second notch 114, 116 to support different functions and/or positions of toe guard 100, as further described below.

As shown in FIGS. 3A-3B and 4A-4B, toe guard 100 may further include a first locking pin 118 configured to engage with the first notch 110, 112 of first sidewall 102 and second sidewall 104, and a second locking pin 120 configured to engage with the second notch 114, 116 of first sidewall 102 and second sidewall 104. As particularly shown in FIGS. 4A-4B, first and second locking pins 118, 120 may include a central elongate member M connected to one or more end caps E, helping to prevent first and second locking pins 118, 120 from shifting from side to side once respectively engaged with first notches 110, 112 and second notches 114, 116 during operation of toe guard 100, as further discussed below. The dimensions of first and second locking pins 118, 120 may vary depending on the width of first and second sidewalls 102, 104, and the shapes/sizes of first notches 110, 112, and second notches 114, 116, as discussed above. In some embodiments, elongate member M may be approximately 2.688 inches in length. End caps E may be approximately 0.07 inches in width, and include a circular shape with an outer ring O and an inner recessed ring I. The end caps E may be configured to contact the outside of first and second sidewalls 102, 104 (FIG. 3B), or may be configured to contact the inside of first and second sidewalls 102, 104 (FIG. 3C). In some embodiments, as particularly shown in FIG. 3C, end caps E of first locking pin 118 may be configured to contact the inside of first and second sidewalls 102, 104, while the end caps E of second locking pin 120 may be configured to contact the outside of first and second sidewalls 102, 104, and vice versa. The outer ring may have a diameter of approximately 0.75 inches, while the inner recessed ring I may have a diameter of approximately 0.31 inches. As shown in FIGS. 4A-4B and 7A-7B, first locking pin 118 and second locking pin 120 may be removeable such that they may be respectively placed inside and taken out of first notch 110, 112 and second notch 114, 116. This feature provides a benefit of enabling an operator to easily and efficiently engage or disengage toe guard 100 with steering assembly 28.

First notch 110, 112 and second notch 114, 116 may be respectively configured such that when toe guard 100 engages with steering assembly 28, as shown in FIGS. 7A-7B, thereby engaging openings 106 and 108 with the axle 36, first notch 110, 112 may be disposed on a first side 33 of steering column 32, and second notch 114, 116 may be disposed on a second side 34 of steering column 32. In some embodiments, first side 33 and second side 34 of steering column 32 may be opposite from each other. Such opposite configuration of first notch 110, 112 and second notch 114, 116 enables first locking pin 118 to engage with steering column 32 when the second locking pin 120 disengages from steering column 32, and vice versa. That is, when toe guard 100 is in a first position (FIG. 7A) that may safely protect an operator's foot from potential injury, as discussed above, the second locking pin 120 may engage with steering column 32 while the first locking pin 118 disengages from steering column 32. In the event toe guard 100 is placed in a second position (FIG. 7B), such as when an operator may inadvertently kick toe guard 100 in an upward direction, the first locking pin 118 may engage with steering column 32 while the second locking pin 120 disengages from steering column 32. As shown in FIGS. 7A-7B, and further described below, such configuration ensures toe guard 100 remains securely engaged with steering assembly 28, without needing to be rigidly fixed to one or more components of steering assembly 28.

First notch 110, 112 and second notch 114, 116 may be configured in different shapes and/or sizes relative to each other to help support the above-described first and second positions of toe guard 100. For example, second notch 114, 116 may be configured as a deeper hook shape opening to ensure that when toe guard 100 is in a first position (FIG. 7A)—one in which toe guard 100 is in most of the time when toe guard 100 is in use—the second locking pin 120 sits far enough down inside second notch 114, 116 to keep toe guard 100 securely engaged with steering column 32. On the other hand, first notch 110, 112 may be configured as a shallower hook shape opening to ensure that when toe guard 100 is in a second position (FIG. 7B)—one in which toe guard 100 is in only when, e.g., inadvertently kicked upward by an operator—the first locking pin 110 sits far enough down inside first notch 110, 112 to limit the range of motion of toe guard 100 relative to steering column 32.

Figure 5A:
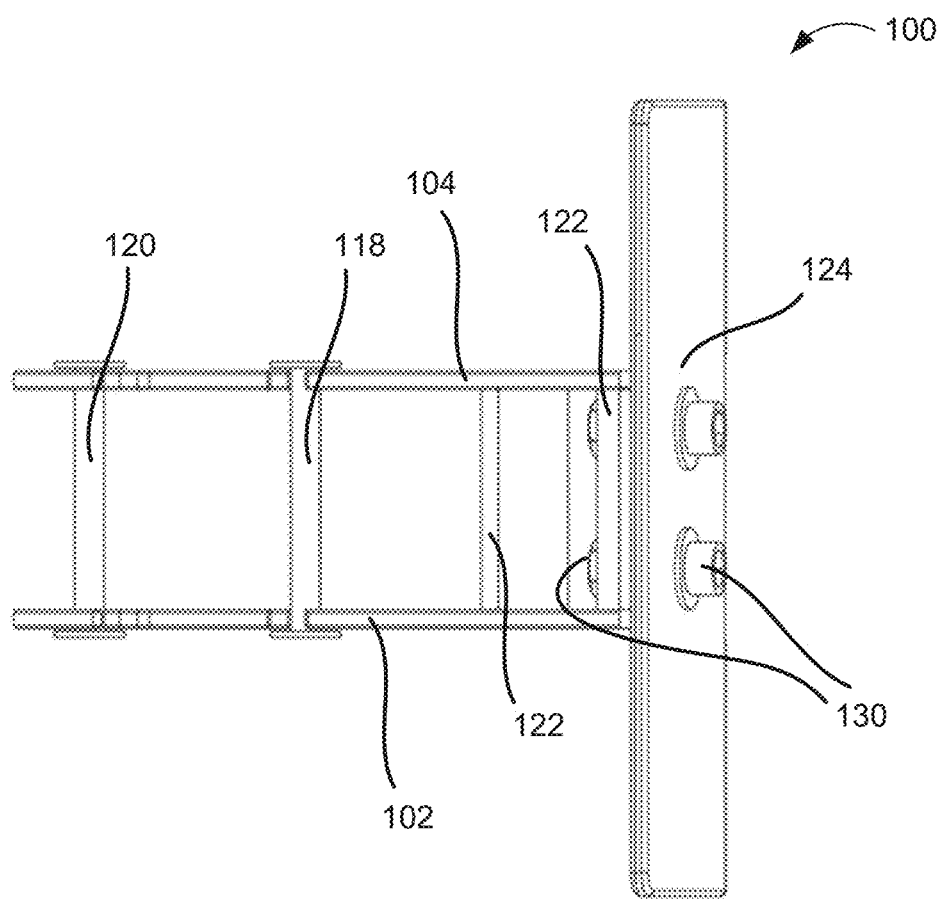
FIG. 5A is a top view of a wheel assembly toe guard according to certain aspects of the present disclosure.

As shown in FIGS. 3A-3B and 4A-4B, toe guard 100 may further include one or more support plates 122 connecting the first sidewall 102 to the second sidewall 104. Toe guard 100 may also include a front plate 124 configured to engage with at least one of the one or more support plates 122 and/or the first and/or second sidewall 102, 104. Front plate 124 may include one or more holes 126 while a support plate 122 may include one or more holes 128, as shown in FIG. 4A. Hardware 130 (e.g., screws, washers, hex nuts, etc.) may be used to securely fasten front plate 124 to a support plate 122 using holes 126 and 128, as shown in FIGS. 4B and 5A. For example, one or more screws may be respectively inserted into one or more washers, both respectively inserted through holes 126 and 128. One or more hex nuts may then be respectively screwed onto the ends of the screws to keep front plate 124 tightly fastened against a support plate 122, as shown in FIG. 5A. One of skill in the pertinent art will appreciate that any type of similarly functioning hardware could be used to fasten front plate 124 to a support plate 122 and/or first and/or second sidewalls 102, 104.

In some embodiments, front plate 124 may be configured to adjustably engage with at least one of the one or more support plates 122. In such embodiments, hardware 130 may be loosened and/or removed, as shown in FIGS. 4A-4B, such that the clearance between the front plate 124 and the ground may be adjusted. For example, to adjust front plate 124 such that it sits closer to the ground, hardware 130 may be loosened and/or removed such that front plate 124 may be slid downward relative to support plate 122 while still keeping holes 126 and 128 aligned to be able to use hardware 130 as described above. In some embodiments, holes 126 may include a more elongated shape in comparison to holes 128, as shown in FIG. 4A, such that front plate 124 can be easily adjusted upward and downward relative to support plate 122. In some embodiments, front plate 124 may provide a minimum clearance to the ground of approximately 0.50 inches, and a maximum clearance of approximately 0.625 inches. This adjustable feature provides the benefit of protecting an operator's toes and/or shoes, of any size, from contacting wheel assembly 28 when toe guard 100 is in use.

Figure 3A:
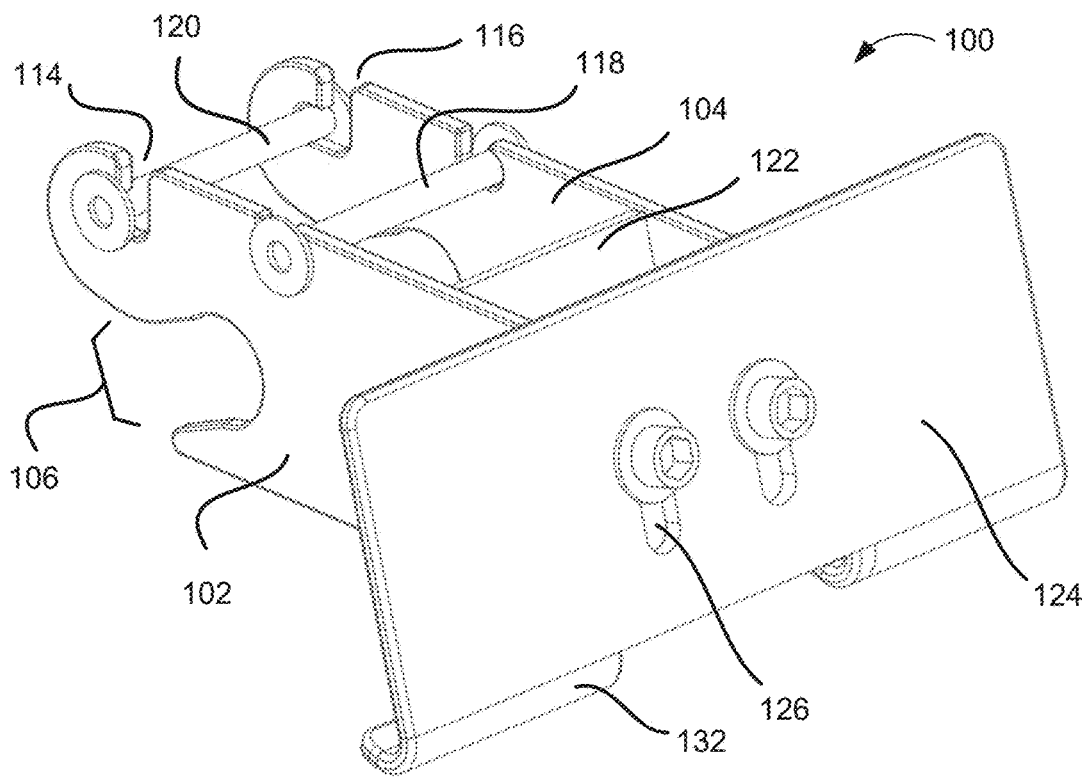
FIG. 3A is a front left perspective view of a wheel assembly toe guard according to certain aspects of the present disclosure.
Figure 3B:
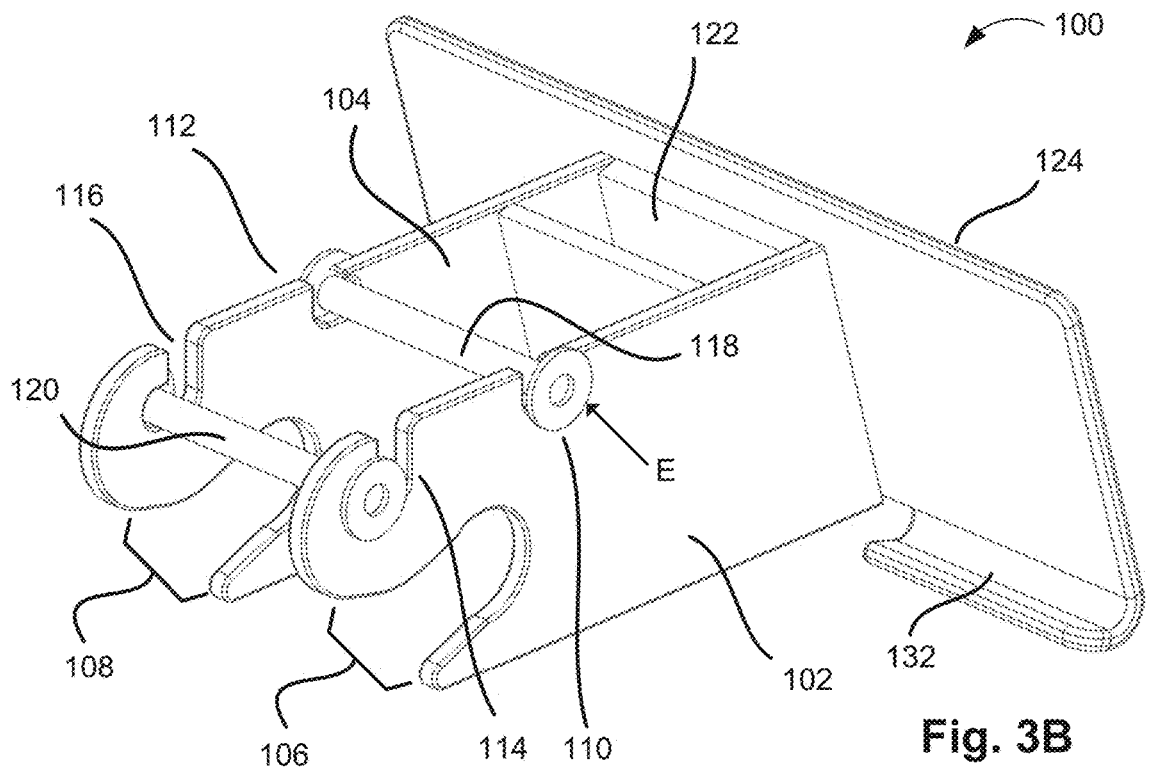
FIG. 3B is a rear left perspective view of a wheel assembly toe guard according to certain aspects of the present disclosure.
Figure 3D:
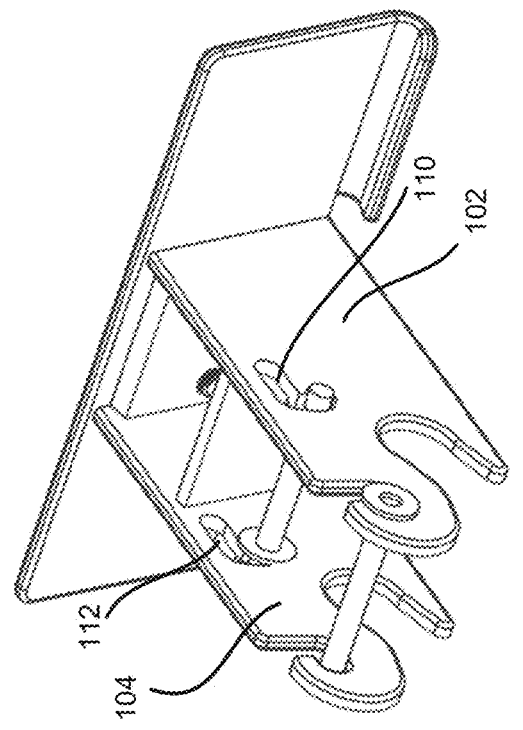
FIG. 3D is a rear left perspective view of a wheel assembly toe guard according to certain aspects of the present disclosure.
Figure 3E:
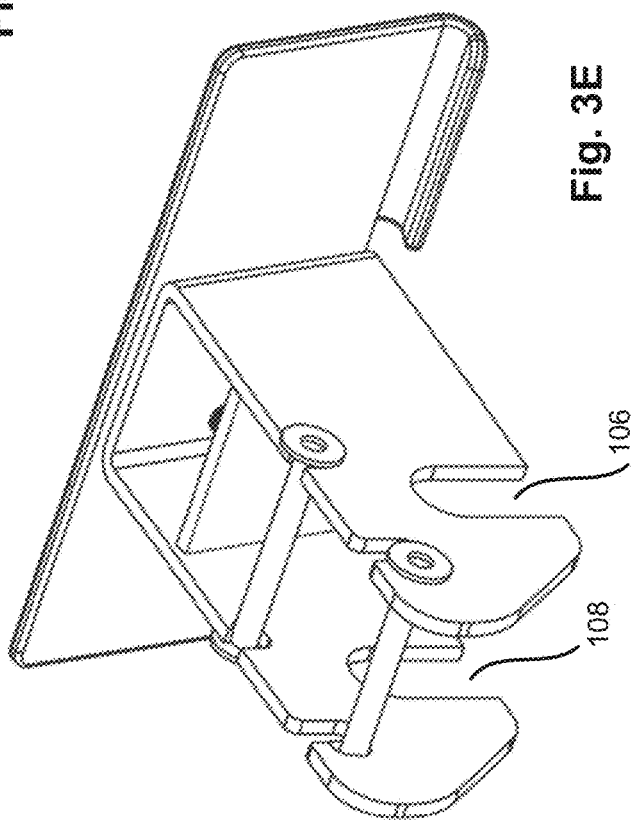
FIG. 3E is a rear left perspective view of a wheel assembly toe guard according to certain aspects of the present disclosure.
Figure 3C:
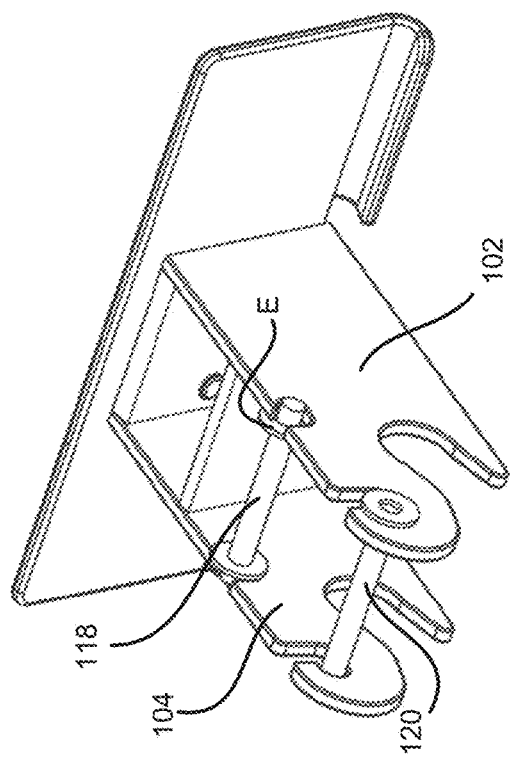
FIG. 3C is a rear left perspective view of a wheel assembly toe guard according to certain aspects of the present disclosure.
Figure 5B:
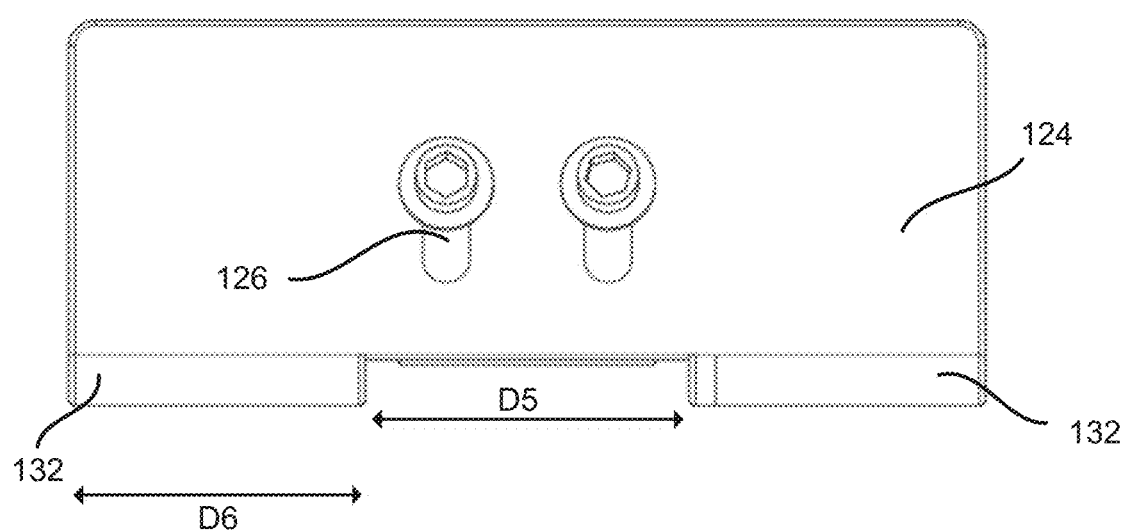
FIG. 5B is a front view of a wheel assembly toe guard according to certain aspects of the present disclosure.

In some embodiments, front plate 124 may be adjustably fastened to at least one support plate 122 such that front plate 124 and the fastened support plate 122 are disposed parallel to each other, as shown in FIG. 3B. In some embodiments, front plate 124 may include one or more bumpers 132 extending from a bottom edge of front plate 124, as shown in FIGS. 4B, 5B, and 6. In some embodiments, bumpers 132 may be curved, equally sized, and/or respectively disposed on a right and left side of the bottom edge of front plate 124, as shown in FIGS. 4B and 5B. In some embodiments, as shown in FIG. 5B, bumpers 132 may be separated by a space D5 of approximately 3.00 inches, with the width D6 of each bumper 132 being approximately 2.75 inches.

FIG. 9 illustrates an operator P transporting a load 222 (in phantom) using pallet truck 200 with toe guard 100 engaged to a wheel assembly 280. As shown, pallet truck 200 may be of a type having a rear steer wheel 300 rotatable about an axle 360 steerable, by an attached steering column 320, within a horizontal plane relative to the pallet truck 200. Pallet truck 200 may include an operator handle 380 attached to pallet truck 200 about handle pivot pin 400. Pivoting operator handle 380 up and down about handle pivot pin 400 may actuate the lifting mechanism of pallet truck 200, raising and lowering frame 420 and forks 240, 250. Swinging operator handle 380 side to side may cause steering column 320, which may depend downwardly from frame 420, to turn steer wheels 300. Steer wheels 300 may be mounted on axle 360.

To engage toe guard 100 with wheel assembly 280, as described herein, an operator may position toe guard 100 with axle 360 such that openings 106, 108 of first and second sidewalls 102, 104 are respectively engaged with axle 360 (FIGS. 7A-7B). During this step, first and second locking pins 118, 120 may be disengaged from toe guard 100, as shown in FIGS. 4A-4B. The operator may then engage first locking pin 118 with first notches 110, 112 of first and second sidewalls 102, 104 such that first locking pin 118 is seated down inside first notches 110, 112. The operator may then engage second locking pin 120 with second notches 114, 116 of first and second sidewalls 102, 104 such that second locking pin 120 is seated down inside second notches 114, 116. In some embodiments, first locking pin 118 may not be removable from toe guard 100. That is, first locking pin 118 may be fixed to first and second sidewalls 102, 104 via first notches 110, 112. In such embodiments, the operator may only need to engage second locking pin 120 with second notches 114, 116 of first and second sidewalls 102, 104 after positioning toe guard 100, including first locking pin 118, with axle 360, as discussed above. In some embodiments, toe guard 100 may only include a single locking pin, e.g., second locking pin 120. In such embodiments, an operator may only need to engage second locking pin 120 after positioning toe guard 100 with axle 360. As discussed above, such configuration with only a single locking pin may be used in conjunction with vertical, or downward facing, U-shaped openings 106, 108 to help prevent toe guard 100 from becoming dislodged from wheel assembly 280 while in use.

The above-described embodiments allow for engaging toe guard 100 with wheel assembly 280 while wheels 300 are already in place. In other embodiments, wheels 300 may be removed prior to engaging toe guard 100 with wheel assembly 280. In such embodiments, first notches 110, 112 and/or second notches 114, 116 may be configured as through-holes in first and second sidewalls 102, 104 such that first and/or second locking pins 118, 120, or other alternative types of fasteners (e.g., screws, nuts, etc.), may be inserted through the through-holes and fastened in place. Wheels 300 may then be assembled on wheel assembly 280.

In some embodiments, the operator may adjust the clearance between front plate 124 and the ground by adjusting hardware 130 (e.g., loosening, tightening) and moving front plate 124 up and/or down with respect to the at least one adjustably engaged support plate 122, as described above.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values ±20% of the recited value, e.g. "about 90%" may refer to the range of values from 71% to 99%.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A toe guard for use on a wheel assembly, the toe guard comprising:
   a first sidewall comprising:
      a first axle opening configured to engage with an axle of the wheel assembly; and
      a first locking opening configured to be disposed on a first side of a steering column of the wheel assembly;
   a second sidewall comprising:
      a second axle opening configured to engage with the axle of the wheel assembly; and
      a second locking opening configured to be disposed on a second side of a steering column of the wheel assembly;
   a first locking pin configured to engage with the first locking opening; and
   a second locking pin configured to engage with the second locking opening, and
   the first and second sides of the steering column are opposite one another, and
   the first locking pin is configured to engage with the steering column when the second locking pin is disengaged from the steering column.

2. The toe guard of claim 1, further comprising:
   one or more support plates connecting the first sidewall to the second sidewall; and
   a front plate configured to engage with at least one of the one or more support plates or connect with at least one of the sidewalls.

3. The toe guard of claim 2, wherein the front plate comprises one or more bumpers extending from a bottom edge of the front plate.

4. The toe guard of claim 2, wherein the front plate is configured to adjustably engage with the at least one of the one or more support plates such that a clearance between the front plate and the ground is adjustable.

5. The toe guard of claim 2, wherein the front plate and the at least one of the one or more support plates are disposed parallel to each other.

6. The toe guard of claim 1, wherein the second locking pin is configured to engage with the steering column when the first locking pin is disengaged from the steering column.

7. A toe guard for use on a wheel assembly, the toe guard comprising:
   a first sidewall comprising:
      a first axle opening configured to engage with an axle of the wheel assembly;
      a first locking opening configured to be disposed on a first side of a steering column of the wheel assembly; and
      a second locking opening configured to be disposed on a second side of a steering column of the wheel assembly;
   a second sidewall comprising:
      a second axle opening configured to engage with the axle of the wheel assembly;
   a first locking pin configured to engage with the first locking opening; and
   a second locking pin configured to engage with the second locking opening, and
   the first and second sides of the steering column are opposite one another, and
   the first locking pin is configured to engage with the steering column when the second locking pin is disengaged from the steering column.

\* \* \* \* \*